United States Patent [19]
Furuuchi et al.

[11] 3,801,352
[45] Apr. 2, 1974

[54] PROCESS FOR PREPARING HARD COATED FILM HAVING SCRATCH RESISTANCE

[75] Inventors: Shigemasa Furuuchi; Akira Nishihara; Yasuharu Okajima, all of Yokohama; Tadatoshi Kamimori, Tokyo, all of Japan

[73] Assignee: Asahi Glass Company Limited, Tokyo, Japan

[22] Filed: June 2, 1972

[21] Appl. No.: 259,017

[52] U.S. Cl............... 117/62, 117/63, 117/72, 117/76 F, 117/93.31, 117/106 A, 117/124 A, 117/124 E, 117/124 F, 117/138.8 A, 117/138.8 UA, 117/138.8 F
[51] Int. Cl............... B44d 1/14, B44d 1/44
[58] Field of Search........... 117/106 A, DIG. 3, 72, 117/76 F, 54, 124 A, 124 F, 124 E, 62, 63, 117/138.8 A, 138.8 UA, 138.8 F

[56] References Cited
UNITED STATES PATENTS

| | | | |
|---|---|---|---|
| 3,013,901 | 12/1961 | Bugosh | 117/72 |
| 3,089,784 | 5/1963 | Dowling | 117/72 X |
| 3,119,707 | 1/1964 | Christy | 117/72 X |
| 3,407,085 | 10/1968 | Kitaj et al. | 117/72 |
| 3,481,763 | 12/1969 | Hider et al. | 117/54 X |
| 3,713,869 | 1/1973 | Geffcken et al. | 117/72 X |

Primary Examiner—Ralph Husack
Attorney, Agent, or Firm—Oblon, Fisher, Spivak, McClelland, & Maier

[57] ABSTRACT

A scratch resistant film is prepared by coating a thin hard inorganic layer of $SiO_{1+x}$, wherein $x$ ranges from 0 to 1, onto a substrate, applying a polymerizable ethylenically unsaturated monomer or oligomer thereon and solidifying said monomer or oligomer.

5 Claims, No Drawings

PROCESS FOR PREPARING HARD COATED FILM HAVING SCRATCH RESISTANCE

BACKGROUND OF THE INVENTION

1. Field Of The Invention

This invention relates to a process for preparing a scratch resistant film by providing a hard coating onto a substrate, such as a plastic film.

2. Description Of The Prior Art

Transparent plastic articles generally possess quite poor scratch resistance and chemical resistance. In order to enhance these properties, it has been suggested to coat the article with a hard, thin, inorganic material, such as silicon oxide. This has been accomplished in the prior art by such techniques as vacuum deposition, vacuum sputtering or the like. Although these types of coating have been satisfactory for improving scratch resistance, they are usually characterized by an undesirably low degree of chemical resistance particularly against corrosive gases or solvents. Moreover, although inorganic coatings possessing good scratch resistance have been obtained, they do not possess as high a degree of scratch resistance as conventional scratch resistant coatings.

For instance, hard films of $SiO_{1+x}$ ($0 \leq x \leq 1$) in a thickness of about $2\mu$, coated onto a substrate of polymethyl methacrylate by vacuum deposition techniques, will be dissolved away when immersed in an aqueous solution of 2 percent $Na_2CO_3$ for 4 hours. When immersed in acetone for 1 hour, the methyl methacrylate base will become solvent swollen.

SUMMARY OF THE INVENTION

Accordingly, it is one object of this invention to provide a process for preparing a hard coated scratch resistant film having improved corrosion resistance, particularly improved alkali resistance, organic solvent resistance and scratch and mar resistance.

It has now been ascertained that one cause for low corrosion resistance when $SiO_{1+x}$ is used as the coating material, is that the coating is somewhat porous so that when the film is immersed into an alkali or solvent, the corrosive agent permeates through the coating and attacks the underlying plastic substrate. Moreover, since the hard inorganic layer is brittle, even though it possesses a high degree of hardness, it demonstrates rather poor scratch and mar resistance.

In an effort to alleviate these disadvantages, it has now been discovered that relatively high mar and scratch resistance can be attained by the use of an organic-inorganic complex film instead of the previously used porous inorganic layer. According to the process of this invention, a scratch resistant article is provided by vacuum coating a hard, thin inorganic coating onto a substrate, permeating a polymerizable compound, such as a monomer and oligomer, through the resulting layer and solidifying the compound to bind the inorganic layer.

DETAILED DESCRIPTION OF THE PREFERRED EMBODIMENT

The substrate used for this invention can be any of a variety of films, plates, boards or other articles, and particularly transparent plastic substrates. Suitable transparent plates which may be used for this invention include plastic plates made from methylmethacrylate polymers, acrylic type polymers, polystyrene, polyvinylchloride, polyesters and polycarbonates, and glass plates.

The inorganic layer first coated onto the substrate is preferably transparent. Suitable inorganic materials used for forming this layer include: $SiO_{1+x}$ ($0 \leq x \leq 1$), $SnO_2$, $ZrO_2$, $GeO_2$, $TiO_2$, $MgF_2$, $Nb_2O_5$, $WO_3$ or $Ta_2O_5$. These materials are usually effective for surface protection of a substrate, because coatings formed therefrom are not easily scratched and are not affected by moisture or air. Particularly preferred is $SiO_{1+x}$ because they are characterized by excellent scratch resistance and durability and can be applied so as to form a uniform layer.

The hard, thin inorganic layer can be applied by any conventional technique, such as by vacuum deposition or the like. Vacuum deposition, however, is not preferred since it tends to promote the formation of a micro-porous coating. Of course, other techniques can also be used, such as vacuum sputtering, chemical vapor phase deposition, or chemical solution deposition.

The hard, thin inorganic layer coated onto the substrate is then treated with a suitable polymerizable compound, such as a monomer or oligomer, which is polymerized to solidification.

The polymerizable compound is permeated into the pores of the inorganic layer and reacted with the inorganic material to increase the hardness of the layer. It is preferable that the solidified product of the polymerizable compound be characterized by good alkali resistance and good organic solvent resistance and that the monomer or oligomer used be permeable into the fine pores of the inorganic hard thin layer.

By the term "polymerizable compound" is meant a monomer or oligomer such as those which are hydrolyzed or condensation-polymerized by the catalytic action of light and/or heat. The monomer or oligomer may be reactable with the inorganic hard layer after hydrolysis thereof. For example, it is especially preferable to use a compound having an ethylenically unsaturated double bond which is easily solidifiable in the presence of a catalyst, such as vinyl type monomer containing an ester group. Suitable monomers for this purpose include dialkylphthalate, dialkylglycol carbonate, γ-methacryloxy propyl trimethoxysilane, ethyleneglycol dimethacrylate, γ-methacryloxypropyltrimethoxysilane, ethyleneglycoldimethacrylate and n-triethoxysilyl propyl ethylenediamine.

When a polymerizable silane compound is used with an inorganic layer of $SiO_{1+x}$, the surface is converted to SiOH, it is preferable to select the silane compound such that it is reactable with the SiOH of the inorganic layer.

It is preferable to apply the polymerizable compound without dilution with a solvent, since many organic solvents will corrode the substrate before solidification of the polymerizable compound can be attained. Moreover, a dilute solution will often not be effectively permeated into the pores of the inorganic layer.

A catalyst may be added to the monomer or oligomer to aid polymerization solidification. The particular catalyst used will depend upon the type of monomer or oligomer used, but suitable catalysts usually include the peroxides, eg., benzoyl peroxide, and the amines, e.g., n-propylamine.

In permeating the polymerizable compound into the monomer or inorganic layer, the polymerizable compound may be coated or added dropwise to the inorganic hard thin layer to effect overspreading and is maintained in this condition for a suitable period until permeation into the fine pores of the inorganic layer is sufficiently advanced. The excess coating material is then removed from the surface. Alternatively, the substrate having the inorganic layer thereon may be immersed into a bath of the polymerizable compound, or it may be contacted with an atmosphere of the polymerizable compound prepared in order to effect permeation of the polymerizable compound into the pores of the inorganic layer. The permeated polymerizable compound is then polymerized and solidified by raising the temperature to an appropriate level, or by subjecting the sample to UV light or high energy radiation, whichever is appropriate.

When the solidification of the polymerizable compound is conducted by hydrolysis and condensation-polymerization of the compound, it is quite effective to pretreat the work with an alkaline solution or an alkali salt solution. A small amount of alkali will remain in the inorganic layer if it is pre-treated with an alkaline solution, and this residual will promote the hydrolysis reaction. Moreover, the surface of the inorganic layer will be etched to form a more reactive surface and hence will accelerate the cure of the monomer or oligomer.

The hydrolysis reaction can also be promoted by treating the inorganic layer with water or steam and permitting a small amount of water to remain on the surface.

The polymerizable compound permeated into the inorganic layer is preferably kept in an air bath saturated with steam at a temperature of 10°–90° C. to effect solidification by aging. When solidification is effected in this manner, the solidified mass will form a stable coating film which is firmly bound to the inorganic hard thin layer.

Permeation of the polymerizable compound into the inorganic layer can be proven by measurement of the ATR spectrum (Attenuated Total Reflection). When the polymerizable compound is impregnated into the inorganic layer coated on the substrate, and solidified, after any residual polymerizable compound remaining on the surface layer is completely removed, and the (ATR) spectrum of the sample measured, the spectrum of the polymer or solidified polymerizable compound will be observed, evidencing satisfactory impregnation.

In this invention, the thickness of the inorganic hard thin layer is not critical, and will depend upon the particular intended uses. The method of forming the inorganic layer likewise is not critical and can be widely varied according to necessity.

It is preferable that the thickness of the inorganic layer be within the range of 1 – 5 $\mu$. It is difficult to provide sufficient scratch and mar resistance if the thickness is less than 1 $\mu$. On the other hand, peeling can often occur if the thickness is greater than 5$\mu$.

Having generally described the invention, a further understanding can be attained by reference to the following specific Examples which are provided herein for purposes of illustration only and are not intended to be limiting in any manner unless otherwise specified.

EXAMPLE 1

A methylmethacrylate resin plate (9 cm × 9 cm × 3 cm) was placed into a vacuum evaporation coating apparatus. 2 lines of boats made of molybdenum having a tantalum layer at the bottom, in which SiO was added, were arranged in parallel, 17 cm. below the methylmethacrylate plate. The vacuum evaporation coating apparatus was maintained at a pressure of 5 × $10^{-4}$ mm Hg and 150 – 145 amps of electric current was supplied to evaporate the SiO at about 1,300° C. An $SiO_{1+x}$ layer of 2 $\mu$ was deposited onto the methylmethacrylate plate, which was heated to 75° C. 2 g. of solution of diallylphthalate

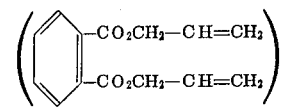

and 1 percent benzoylperoxide was added dropwise and overspread onto the $SiO_{1+x}$ layer coated on the methylmethacrylate plate. The combination was maintained for 6 hours and then the residual diallylphthalate solution was removed and the plate was kept in an air bath at 80° C. for 24 hours to polymerize the methylmethacrylate with the layer. The Sample 1 was obtained.

EXAMPLE 2

2 g. of diallylglycolcarbonate solution ($CH_2$ = $CHCH_2OCO_2(CH_2)_2O(CH_2)_2OCH_2$ = $CH_2$)
and 1 percent of benzolyperoxide was added dropwise and overspread onto the $SiO_{1+x}$ layer coated on the methylmethacrylate plate, prepared in accordance with the process of Example 1, and was maintained for 6 hours. The residual solution was removed from the surface and the plate was kept in an air bath at 80° C. for 24 hours to polymerize the monomer with the layer. The Sample 2 was obtained.

EXAMPLE 3

$\gamma$-methacryloxypropyltrimethoxysilane ($CH_2$ = $C(CH_3)CO_2(CH_2)_3Si(OCH_3)_3$) was heated to about 100° C. to form a vapor phase and was contacted, for 30 minutes, with the $SiO_{1+x}$ layer coated on the methylmethacrylate plate, prepared in accordance with the process of Example 1, to effect permeation into the layer. The plate was kept for 24 hours at room temperature. The Sample 3 was obtained.

EXAMPLE 4

2 g. of solution of ethyleneglycoldimethacrylate ($CH_2$ = $C(CH_3)$-CO-($OCH_2$-$CH_2$)-$OCOC(CH_3)$=$CH_2$) and 0.3 percent benzoyl peroxide was added dropwise and overspread onto the $SiO_{1+x}$ layer coated on the methylmethacrylate plate, prepared in accordance with the process of Example 1 and was kept for 6 hours. The residual solution was removed from the surface and the plate was kept in an air bath at 80° C. for 24 hours to polymerize the monomer with the layer. The Sample 4 was obtained.

EXAMPLE 5

The methylmethacrylate plate having an $SiO_{1+x}$ layer, prepared in accordance with the process of Example 1, was kept in a room saturated with steam at 60° C. for 4 hours and then was immersed in a 10 percent KOH aqueous solution at room temperature for 60 seconds. It was then washed with water and then with ethanol and was dried. A plate having an $SiO_{1+x}$ layer was immersed into a solution of γ-methacryloxypropyl-trimethoxysilane ($CH_2 = C(CH_3)CO_2(CH_2)_3Si(OCH_3)_3$) and 0.5 percent of benzoyl peroxide, at 40° C. After 30 minutes, the plate was removed and washed with ethanol and was dried and kept in an aging room saturated with steam at 60° C. for 10 hours. The Sample 5 was obtained.

EXAMPLE 6

The methylmethacrylate plate having $SiO_{1+x}$ layer, prepared in accordance with the process of Example 1, was kept in a room saturated with steam at 60° C. for 4 hours and then was immersed in a 10 percent KOH aqueous solution at room temperature for 60 seconds. It was then washed with water and then with ethanol and dried. A plate having a $SiO_{1+x}$ layer was immersed in a solution of γ-methacryloxysilane and ethyleneglycoldimethacrylate of 1:1, and 0.5 percent of benzoyl peroxide, at 40° C. After 30 minutes, the plate was removed and washed with ethanol and was dried and kept in an aging room saturated with steam at 60° C. for 10 hours. The Sample 6 was obtained.

EXAMPLE 7

The methylmethacrylate plate having $SiO_{1+x}$ layer prepared in accordance with the process of Example 1 was kept in a room saturated with steam at 60° C. for 4 hours and then was immersed in a 10 percent KOH aqueous solution at room temperature for 60 seconds and was washed with water and then with ethanol and dried. A plate having an $SiO_{1+x}$ layer was overspread by n-triethoxy silylpropyl ethylenediamine $H_2N(CH_2)_2NH(CH_2)_3Si(OCH_3)_3$, at room temperature under dry $N_2$. After 30 minutes, the plate was removed and washed with ethanol and was dried and kept in an aging room saturated with steam at 60° C. for 10 hours. The Sample 7 was obtained.

EXAMPLE 8

The polymethylmethacrylate plate coated with $SiO_{1+x}$ in accordance with the process of Example 1, was immersed into a solution of γ-methacryloxypropyl trimethoxysilane containing 10 percent by volume of n-propylamine at 40° C. for 30 minutes and was removed and washed with water and dried. The coated plate was kept in an aging room saturated with steam, at 60° C. for 10 hours. The Sample 8 was obtained.

EXAMPLE 9

The polymethacrylate plate coated with $SiO_{1+x}$ in accordance with the process of Example 1, was immersed in 1M-$NaClO_4$ aqueous solution for 5 hours, and was removed and washed with water and then washed with ethanol and dried.

The plate was immersed in a solution of γ-methacryloxypropyl trimethoxysilane having the formula: $CH_2=C(CH_3)CO_2(CH_2)_3Si(OCH_3)_3$ containing 0.5 percent of benzoyl peroxide at 40° C. After 30 minutes, the plate was removed and washed with ethanol and was dried and kept in an aging room saturated with steam at 60° C. for 10 hours. The Sample 9 was obtained.

EXAMPLE 10

The polymethylmethacrylate plate coated with $SiO_{1+x}$ in accordance with the process of Example 1, was kept in an atmosphere of hydrogen at 60° C. for aging, and the coated layer of $SiO_{1+x}$ was treated with 10 percent KOH at room temperature for 20 seconds. $CF_3(CH_2)_5CH_2CH_2Si(OC_2H_5)_3$ was spread dropwise onto the coated layer of $SiO_{1+x}$ and kept for 30 minutes, and then the excess compound was removed.

The coated plate was kept in an aging room saturated with steam at 60° C. for 10 hours. The Sample 10 was obtained.

EXAMPLE 11

The Samples 1 – 7, obtained in Examples 1 – 7, were tested to measure alkali resistance, scratch and mar resistance, and organic solvent resistance. The results are shown in Table I. The alkali resistance test was made by immersing the sample and a control which was not treated with a monomer or oligomer, in a 2 percent $Na_2CO_3$ aqueous solution. After 2 hours, and 4 hours, the rate of decrease of Si-counts by fluorescent X-ray after immersion was measured.

A higher rate of decrease in Si-counts means a lower alkali resistance.

Scratch resistance was measured by dropping 250 g. of 46 mesh carborundum particles from a height of 70 cm. onto a test piece.

The cloudinesses in each sample and in the control, before and after testing, were respectively measured by ASTM D-673-44. The difference of Heize percent between them is shown in Table I.

The organic solvent resistance test was made by immersing only the surface of $SiO_{1+x}$ of the sample, or untreated control in acetone at 25° C. for 1 hour, and observing the change of appearance.

The results are shown by a rating on a scale of 10, wherein 10 indicates no change in the layer and 0 indicates complete damage of the layer or peeling off of the hard thin inorganic layer.

TABLE I

| | Test Results | | | |
|---|---|---|---|---|
| | Alkali resistance | | Scratch resistance | Organic solvent resistance |
| | after 2 hours | after 4 hours | | |
| | (%) | (%) | (%) | Scale(1–10) |
| Sample | | | | |
| 1 | 8.2 | 10.9 | 8.3 | 4.0 |
| 2 | 10.7 | 13.5 | 8.2 | 5.0 |
| 3 | 5.3 | 5.8 | 5.4 | 7.0 |
| 4 | 1.7 | 2.0 | 8.4 | 4.0 |
| 5 | 0.0 | 1.0 | 5.0 | 9.0 |
| 6 | 0.0 | 1.0 | 4.5 | 8.5 |
| 7 | 0.5 | 1.5 | 5.0 | 9.5 |
| 8 | 1.0 | 2.0 | 5.0 | 9.0 |
| 9 | 0.0 | 1.0 | 4.6 | 9.0 |
| 10 | 0.0 | 0.5 | 45.0 | 9.6 |
| Control 8 | 57.8 | 73.0 | 8.0 | 0 (swell) |
| Acryl only | — | — | 46.0 | 0 (swell) |

The control 8 is a methylmethacrylate plate having an $SiO_1$ layer prepared in accordance with the process of Example 1, which was not treated with a monomer or oligomer.

In accordance with this invention, the fine pores of the hard thin inorganic layer are bound with a polymer having a high alkali resistance and a high organic solvent resistance, whereby the alkali resistance and organic solvent resistance of the hard coating layer is substantially enhanced. The polymer permeated into the inorganic layer also imparts softness into the layer and hence increases elasticity.

Accordingly, the scratch resistance and mechanical strength of the layer can be improved and cracking and peeling of the layer can be prevented.

Having now fully described the invention, it will be apparent to one of ordinary skill in the art that many changes and modifications can be made thereto without departing from the spirit or scope of the invention as set forth herein. Accordingly,

What is claimed and intended to be covered by letters patent is:

1. A process for preparing a hard scratch resistant coating which comprises forming a hard, inorganic layer containing fine pores of $SiO_{1+x}$ wherein $x$ ranges from 0 to 1 onto a substrate of films, plates, boards, glass or plastic substrates of methylmethacrylate polymers, acrylate polymers, polystyrene, polyvinylchloride, polyesters or polycarbonate polymers, applying a fluid polymerizable ethylenically unsaturated monomer or oligomer of dialkylphthalates, dialkylglycol carbonate, γ-methacryloxypropyl trimethoxysilane, ethyleneglycol dimethacrylate, γ-methacryloxypropyltrimethoxysilane, ethyleneglycoldimethacrylate or n-triethoxysilylpropylethylenediamine to the inorganic layer wherein a portion of said polymerizable monomer or oligomer permeates into said fine pores and solidifying the polymerizable monomer or oligomer.

2. The process for preparing the hard coating of claim 1, which further comprises treating said inorganic layer with an alkali solution or alkali salt solution before applying the polymerizable monomer or oligomer.

3. The process for preparing the hard coating of claim 1, which further comprises vacuum depositing said inorganic layer of $SiO_{1+x}$.

4. The process for preparing the hard coating of claim 1, wherein the polymerizable monomer or oligomer is a silane compound.

5. The process for preparing the hard coating of claim 1, which further comprises vacuum coating said $SiO_{1+x}$ layer onto said plastic substrate, treating said coated plastic substrate with an alkali solution or an alkali salt solution, permeating said treated plastic substrate with a silane and solidifying said permeated silane.

* * * * *